Nov. 20, 1956 D. P. VITERISI 2,771,549
SIGNAL RECEIVING CIRCUIT
Filed Feb. 10, 1955
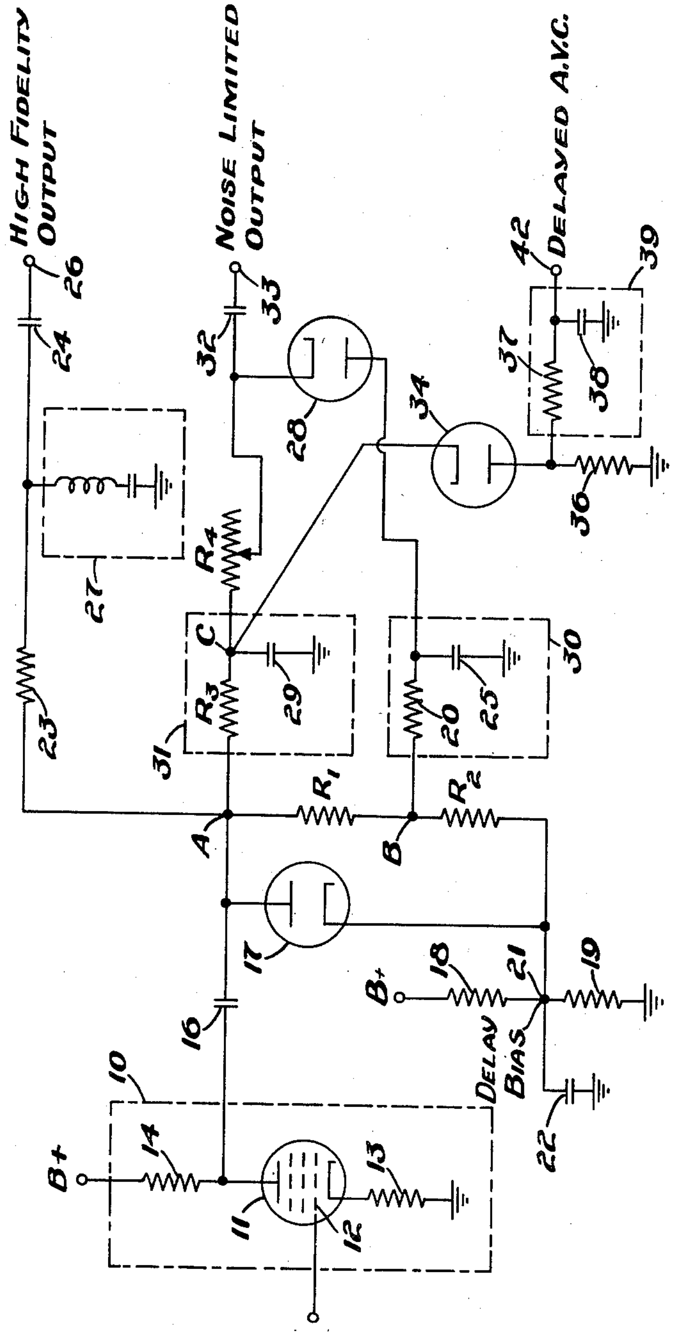
INVENTOR.
DOMENICK P. VITERISI
BY Morris Moody
ATTORNEY

United States Patent Office 2,771,549
Patented Nov. 20, 1956

2,771,549

SIGNAL RECEIVING CIRCUIT

Domenick P. Viterisi, Cedar Rapids, Iowa, assignor to Collins Radio Company, Cedar Rapids, Iowa, a corporation of Iowa Application February 10, 1955, Serial No. 487,387
3 Claims. (Cl. 250—20)

This invention relates generally to signal receiving circuits and particularly to a circuit for receiving modulated radio-frequency energy and providing a plurality of related outputs.

This invention provides a circuit which may be used in a radio receiver to perform the following functions with respect to a received modulated radio-frequency signal: It will detect the received signal using only a single capacitor as the coupling to a prior radio-frequency stage, which may be an intermediate frequency amplifier. It will further provide noise limiting action for the detected output by interrupting that output when a noise pulse exceeds a voltage level corresponding to a predetermined percentage of modulation. It will still further provide a delayed automatic volume control output voltage having the required negative polarity but will permit the use of a positive voltage, that is readily obtainable from the B plus supply of the receiver, as the delay voltage. Thus, the radio receiver need not have the conventionally required negative voltage supply to provide delay for its automatic volume control output.

It is therefore an object of this invention to provide a signal receiving circuit of simple construction wherein multiple operations are performed upon an incoming signal.

It is another object of this invention to provide a signal receiving circuit which need not have any tuned components or components requiring critical tolerances.

It is still another object of this invention to provide a signal receiving circuit, for use in a radio receiver, which avoids a tuned transformer coupling to a prior intermediate frequency stage and provides a delayed automatic volume control voltage which may use a positive voltage as the delay voltage.

It is a further object of this invention to provide a noise limiter circuit that is easily adjusted to open the audio output when a noise pulse exceeds any predetermined percentage of modulation.

Further objects, features and advantages of this invention will be apparent to a person skilled in the art upon further study of this specification and drawings; in which, The single figure is a schematic drawing of one form of the invention.

Now referring to the invention in more detail, the figure shows an amplifier 10 which receives and amplifies modulated radio-frequency waves and might be the last intermediate-frequency stage in a radio receiver. Amplifier 10 comprises a pentode tube 11 which receives the incoming radio frequency signal upon its control grid 12 and has a cathode resistor 13 connected between ground and its cathode. A plate resistor 14 is connected between the plate of tube 11 and a B plus voltage source.

A capacitor 16 is connected on one side to the plate of amplifier tube 11 and a detector diode 17 has its anode connected to the other side of capacitor 16. A first resistance means, comprising a pair of serially connected resistors $R_1$ and $R_2$, is connected serially across detector diode 17.

A voltage divider comprising a pair of serially connected resistors 18 and 19 is connected between ground and the B plus voltage source and has an intermediate point 21 connected to the cathode of diode 17. A capacitor 22, having a very large value compared with first capacitor 16, is connected between ground and divided point 21 and prevents alternating components from entering the B plus supply.

A resistor 23 is connected at one end to point A on resistor $R_1$; and a blocking capacitor 24 is connected between the other end of resistor 23 and an output terminal 26 that provides a modulation output that is not noise limited. A series resonant filter 27 is connected between ground and the outer end of resistor 23 and is tuned to the radio frequency components to short-circuit them to ground but does not affect the madulation components.

A resistor 20 is connected between the anode of a noise limiting diode 28 and point B which is intermediate resistors $R_1$ and $R_2$. A capacitor 25 is connected between ground and the anode of diode 28; and resistor 20 and capacitor 25 comprise a low pass filter that blocks only the radio-frequency component in a signal passing from point B to the anode of diode 28.

A pair of resistors $R_3$ and $R_4$ are serially connected between the cathode of noise diode 28 and point A on resistor $R_1$. A capacitor 29 is connected between ground and the intermediate point C between resistors $R_3$ and $R_4$, wherein capacitor 29 and resistor $R_3$ comprise a low pass filter 31 that blocks both modulation and radio-frequency components but passes direct-current carrier components. Resistor $R_4$ is adjustable and may be a potentiometer. Resistance 20 is very small compared to the sum of resistances $R_3$ and $R_4$. A blocking capacitor 32 is connected between the cathode of diode 28 and an output terminal 33. Thus, the noise limited output is taken from the cathode of diode 28.

A delay diode 34 is provided to obtain delay for an automatic volume control output. A resistor 36 is serially connected between ground and the anode of delay diode 34. Another resistor 37 is connected between the anode of diode 34 and output terminal 42; and a capacitor 38 is connected between ground and terminal 42, wherein resistor 37 and capacitor 38 provide a smoothing filter 39 for the automatic volume control output voltage. The cathode of diode 34 is connected to point C in filter 31. The automatic volume control output voltage is taken across resistor 36 and is provided to output terminal 42.

In the operation of the detecting portion of the circuit, first capacitor 16 has a dual function and not only is a blocking capacitor but also is the charging capacitor for the detector circuit. It is charged by the radio-frequency input acting through the asymmetric conduction properties of diode 17. Capacitor 16 discharges at the modulation rate through the resistance means comprising resistors $R_1$ and $R_2$; and therefore they have a time-constant sufficiently small that the modulation components will not be substantially attenuated. The discharge of capacitor 16 through resistors $R_1$ and $R_2$ provides negative voltage across them that varies with the modulation envelope of the carrier. If the polarity of diode 16 is reversed, the other carrier envelope is detected. Thus, there will appear across the first resistance means a direct-voltage component proportional to carrier, an audio-frequency component proportional to the modulation, and radio-frequency components. The direct-voltage carrier component will have a negative polarity across these resistors with respect to ground due to the selected polarity of detector diode 17.

An output signal proportional to the modulation may be removed from point A and is provided at terminal 26 after passing through resistor 23 and capacitor 24, which blocks the direct-voltage carrier component. Series-resonant filter 27 is tuned to the carrier-frequency components and thus shorts them to ground to prevent them from being part of the output; and hence, a substantially pure audio output may be taken at terminal 26. This output is not noise limited and also is not modulation limited.

Another audio-output may be taken from the cathode of diode 28; and this output has the benefit of noise limiting action. When a signal is received, point A is more negative than B because of the polarity of detector diode 17. Thus, the direct-component of voltage across resistor $R_1$ biases limiter diode 28 to a conducting state, since its cathode is maintained more negative than its anode. The modulation component is taken from point B on the first resistance means through low pass filter 30 and passes through normally conducting diode 28 to audio output terminal 33. Capacitor 32 merely blocks the direct-current component. The modulation components at terminal 33 cannot be taken from point A due to filter 31 which blocks the modulation and radio-frequency components. However, filter 31 and resistor $R_4$ permit the direct-current carrier component to reach the cathode of limiter diode 28 to maintain it at a direct potential approximately the same as the carrier component at point B.

The noise limiting action of diode 28 may be illustrated by the following example which assumes that the detected carrier voltage at point A is −10 v. D. C. (volts direct-current), that resistors $R_1$ and $R_2$ are equal to provide −5 v. D. C. at point B, and that the voltage at point 21 is zero, since this voltage does not affect the operation of diode 28. If it is also assumed that resistors $R_3$ and $R_4$ are equal and that resistor 20 is negligible, then conduction will occur through the limiter diode 28 and resistors $R_3$ and $R_4$, due to the difference of potential between points A and B. If resistors $R_3$ and $R_4$ are very large in value compared with resistor $R_1$, there will be five volts between points B and C which will divide into substantially equal amounts of −2.5 volts each across resistors $R_3$ and $R_4$, since the forward resistance of diode 28 is negligible; and there will be −7.5 v. D. C. to ground at point C.

Any sudden rise in detected voltage that might be caused by a large noise pulse will not be transmitted through filter 31 and the voltage at point C will remain at substantially −7.5 v. D. C. Hence, the voltage at point C is substantially locked at the value of the direct carrier component in the presence of noise pulses and modulation.

However, there is no filter between point C and the cathode of limiter diode 28, and the cathode may fluctuate in potential about its prior value of about −5 v. D. C. Also, the direct connection between point B and the anode of diode 28 permits the anode to follow the fluctuations of voltage at point B due to noise pulses and modulation. As long as the fluctuation at point B does not exceed −7.5 v. D. C., a negative potential exists between points B and C that maintains diode 28 in a conducting state to transmit modulation to terminal 33. However, if a noise pulse is sufficiently large, the voltage at point B will exceed −7.5 v. D. C. and anode of diode 28 will be driven negative with respect to its cathode to open the diode and prevent an audio output from reaching terminal 33 for the period of the noise pulse. Thus, the voltage at point B is permitted to fluctuate up to −2.5 volts above the −5 volt carrier level before diode 28 opens; and therefore, diode 28 opens on any impulse which exceeds the fifty percent modulation level.

The audio output passes undistorted through diode 28 provided it does not exceed the modulation limit set by the preassigned values of resistors $R_1$, $R_2$, $R_3$, and $R_4$. The relationship among the resistors which determines the percentage of modulation level which may not be exceeded by noise pulses or modulation components may be stated by the following formula:

$$L=\frac{100R_1R_4}{R_2(R_3+R_4)} \qquad (1)$$

where L is the limiting percentage of modulation. The formula holds when the sum of resistances $R_3$ and $R_4$ is much greater than the value of resistor $R_1$; and the sum of resistances 37 and 36 is much greater than the value of resistors $R_3$ or $R_4$. Thus, it can be seen from the above formula that the limiting level of the noise limiter may be adjusted to any percentage of modulation, which includes any value between zero and one hundred percent modulation and also includes any level above one hundred percent modulation. When $R_1$ and $R_2$ have equal value and $R_4$ is made variable, the limiting level is adjustable between zero and one hundred percent.

Any modulation exceeding a preset limiting level will also be clipped as well as the noise which exceeds the level. Therefore, the limiting level should be set to the highest modulation level that may be received. The output at terminal 26 is called the "high fidelity output" because its modulation signal will not be clipped at the modulation limiting level set for diode 28 as will the output at terminal 33. Many transmission systems do not modulate to one hundred percent, and it is not uncommon in some systems for modulation to be limited to thirty percent.

The negative direct carrier component of voltage across resistors $R_1$ and $R_2$ may be used as an automatic volume control voltage by providing suitable filters to block the modulation and radio-frequency components.

However, it is generally desired to provide a delay action for an automatic volume control voltage so that the sensitivity of a radio receiver will not be reduced when very weak signals are received.

The present circuit permits a positive direct-voltage to obtain the delay for the negative automatic volume control voltage. The delay voltage is provided at point 21 on the voltage divider comprising resistors 18 and 19 and is readily obtained from the B plus supply of the receiver.

The positive delay voltage does not affect the operation of detector diode 17 or limiter diode 28 because it affects their cathodes and anodes equally and thus does not cause any biasing action on these diodes. However, the positive delay voltage does bias delay diode 34 by making its cathode positive with respect to its anode. Therefore, the positive delay voltage biases diode 34 to a non-conducting state.

However, a received signal causes a negative direct-voltage across resistors $R_1$ and $R_2$ which opposes the positive delay voltage on the cathode of delay diode 34; and when the signal becomes sufficiently large, the negative carrier component nullifies the positive delay voltage at point C and drives the voltage at that point in a negative direction. Thereafter, the voltage at point C biases delay diode 34 to a conducting state, which permits current to flow through resistor 36 to provide a negative voltage that appears at terminal 42 as the delayed automatic control voltage. Thus, no output is provided at terminal 42 until the negative direct-voltage carrier component at point C exceeds the positive delay voltage; and the amount of delay is equal to the magnitude of positive delay voltage across the divider resistor 19.

It is therefore apparent that the invention provides a signal receiving circuit having simple construction and non-critical components to provide a plurality of interrelated functions which include detection, noise limiting, and delayed automatic volume control. It is further apparent that the invention uses capacitor coupling between its detector and a prior radio-frequency stage and that it uses a readily obtainable positive voltage to provide delay for its automatic volume control output. Also, a noise limited output is provided which is easily adjusted to limit at any required percentage of modulation.

Many changes can be made in the above construction of this invention by a man skilled in the art without departing from the scope of the invention. It is therefore intended that all the matter contained in the above description and shown in the accompanying drawing should be interpreted in an illustrative sense and not in a limiting sense.

What is claimed is:

1. A receiving circuit connected to a source of modulated radio-frequency energy providing an output with one side grounded, the circuit comprising, a charging capacitor having one side connected to the ungrounded side of said signal output, a detector diode having its anode connected to the other side of the charging capacitor, a pair of resistors connected in series across the detector diode, a B plus source, a voltage divider connected between the B plus source and ground, the cathode of the detector diode connected to an intermediate point on the divider, a third resistor with one end connected to the point common to the pair of resistors, a noise limiter diode with its anode connected to the other end of the third resistor, a second capacitor connected between ground and the anode of the limiter diode to provide a low pass filter with the third resistor having a cut-off frequency above the modulation frequency, a second pair of resistors connected between the anode of the detector diode and the cathode of the limiter diode, a third capacitor connected between ground and the common point of the second pair of resistors to comprise a modulation blocking low pass filter with the resistor connected to the detector diode, a delay diode having its cathode connected to the ungrounded side of said third capacitor, and another resistor connected serially between ground and the anode of the delay diode, whereby a noise limited signal may be taken from the cathode of the limiter diode and a delayed automatic volume control voltage may be taken from the anode of the delay diode.

2. A receiving circuit connected to a source of modulated radio frequency energy providing an output with one side grounded, the receiving circuit comprising, a charging capacitor having one side connected to the ungrounded output side of said modulated source, a detector diode with its anode connected to the other side of the charging capacitor, a first resistor with one end connected to the anode of the detector diode, a second resistor connected between the other end of the first resistor and the cathode of the detector diode, a third resistor connected at one end to the anode of the detector diode, a second capacitor connected between ground and the other end of said third resistor to comprise a low pass filter with a cut-off frequency below the modulation frequency, a fourth resistor connected at one end to the ungrounded side of the second capacitor, a limiter diode with its cathode connected to the other end of the fourth resistor, a fifth resistor connected between the anode of the limiter diode and the point common to the first and second resistors, a third capacitor connected between ground and the anode of the limiter diode to provide a radio-frequency blocking low-pass filter with the fifth resistor, means for taking a noise limited output from the cathode of the limiter diode where the limiting level is defined by the following formula:

$$L=\frac{100R_1R_4}{R_2(R_3+R_4)}$$

where L is the limiting level presented to noise pulses in terms of percentage of modulation, and $R_1$, $R_2$, $R_3$, and $R_4$ are the resistances of the first, second, third, and fourth resistors, respectively, a voltage divider connected between the B plus source and ground with an intermediate point connected to the cathode of the detector diode to provide a positive delay voltage, a delay diode with its cathode connected to the ungrounded side of the second capacitor, a sixth resistor connected between ground and the anode of the delay diode, a seventh resistor connected at one end to the anode of the delay diode, a fourth capacitor connected between ground and the other end of the seventh resistor to provide another low pass filter that blocks modulation and higher frequencies, and means for taking the delayed automatic control voltage from the ungrounded point of the fourth capacitor.

3. A receiving circuit connected to a modulated radio-frequency source providing an output having one side connected to ground and the receiving circuit comprising, a first capacitor with one end connected to the ungrounded output side of said source, first resistance means with one end connected to the other end of the first capacitor, a detector diode connected across the first resistance means with its anode connected to the first capacitor, a positive direct voltage source connected between ground and the cathode of the detector diode, a low pass filter for passing direct voltage connected at its input end to a point on the first resistance means and having a cut-off frequency below the modulation frequency, a delay diode with its cathode connected to the output side of the low pass filter, second resistance means connected between ground and the anode of the delay diode, third resistance means also connected at one end to the ouput of the low pass filter, a limiter diode with its cathode connected to the other end of the third resistance means, a radio-frequency blocking filter with its input connected to another point on said first resistance means and its output connected to the anode of the limiter diode, the cathode of the limiter diode biased negatively with respect to its anode by the detected signal, whereby a noise limited modulation output is taken from the cathode of the limiter diode and a delayed automatic volume control voltage is taken from the anode of the delay diode.

References Cited in the file of this patent

UNITED STATES PATENTS

| | | |
|---|---|---|
| 2,018,982 | Travis | Oct. 29, 1935 |
| 2,144,304 | Braden | Jan. 17, 1939 |
| 2,345,762 | Martinelli | Apr. 4, 1944 |
| 2,422,976 | Nicholson | June 24, 1947 |

FOREIGN PATENTS

| | | |
|---|---|---|
| 649,262 | Great Britain | Jan. 24, 1951 |